United States Patent
Reni et al.

[15] 3,673,244
[45] June 27, 1972

[54] METHOD OF PRODUCING AROMATIC CARBOXYLIC ACIDS FROM ALKYLBENZENES

[72] Inventors: Cesare Reni, Busto Arsizio; Luigi Lugo, Milan; Giorgio Gualdi, Verona, all of Italy

[73] Assignee: Societa' Italiana Resine S.p.A., Milan, Italy

[22] Filed: June 30, 1970

[21] Appl. No.: 51,364

[30] Foreign Application Priority Data

July 7, 1969 Italy ................................. 19283 A/69

[52] U.S. Cl. ..................... 260/524 R, 252/428, 252/429 R
[51] Int. Cl. ........................................................ C07c 63/02
[58] Field of Search ............................................. 260/524 R

[56] References Cited

UNITED STATES PATENTS 3,387,027  6/1968  Alagy ..................................... 260/524
2,245,528  6/1941  Loder ..................................... 260/524
2,883,421  4/1959  Speer ..................................... 260/524

OTHER PUBLICATIONS

Fieser et al., " Organic Chemistry," 3rd Edition, 1956, pages 207–9.
Florin et al., J. Research of National Bur. Stds. 72A(1), February, 1968, pages 49, 72 and 73.

*Primary Examiner*—Lorraine A. Weinberger
*Assistant Examiner*—R. S. Weissberg
*Attorney*—Sughrue, Rothwell, Mion, Zinn & Macpeak

[57] ABSTRACT

A process for the preparation of aromatic carboxylic acids by the oxidation of alkyl benzenes with oxygen or gases containing molecular oxygen in an aliphatic carboxylic acid environment and in the presence of catalysts consisting of the salts of heavy metals in which the oxidation is carried out in the presence as an activator of an organic compound in which the molecule contains both keto and hydroxy groups.

12 Claims, No Drawings

METHOD OF PRODUCING AROMATIC CARBOXYLIC ACIDS FROM ALKYLBENZENES

This invention relates to an improved process for the production of aromatic carboxylic acids by the oxidation of alkyl benzenes in liquid phase in the presence of catalysts.

There are various known methods of catalytic oxidation of alkyl benzenes in an inert liquid environment, in which, for example, xylenes are converted into the corresponding phthalic acids, toluene into benzoic acid and p-diisopropyl benzene into terephthalic acid.

The products thus obtained are extremely useful to industry.

Terephthalic acid, for example, normally in diester form, is converted, in conjunction with glycols, into polymers that can be used in the production of yarns.

Thus, in one well-known process, p-xylene is oxidized to form p-toluic acid, which is subjected to further oxidation after esterification of the carboxyl group, normally with methanol.

In other familiar processes, alkyl benzenes are oxidized to form the corresponding carboxylic acids, inert solvents being used, in the presence of catalysts consisting of the salts of heavy metals.

With such processes, however, in which use is also made of reaction activators normally consisting of bromine and derivatives thereof, the conversion rates and oxidation selectivity are relatively poor; nor are better results obtained when different activators are employed, such as, for instance, organic compounds in which the molecule contains aldehyde or ketone carbonyl groups.

In some cases, therefore, the unconverted compounds are partially recovered and subjected to further oxidation by, for example, treatment with nitric acid.

The oxidation process thus becomes burdensome, with obvious economic disadvantages.

One object of the present invention is therefore the provision of a process for the catalytic oxidation of alkyl benzenes in liquid phase, in which high speeds of reaction are possible, as well as high rates of conversion to aromatic carboxylic acids.

The scope of the invention also includes a process for the catalytic oxidation of alkyl benzenes in liquid phase to form aromatic carboxylic acids such as require only simple purification treatment to yield products that can be used for the purposes for which they are normally intended.

Further objects of the invention will become apparent from the description which follows.

The process here proposed consists essentially in oxidizing by means of oxygen or gases containing molecular oxygen, alkyl benzenes in an aliphatic carboxylic acid environment, in the presence of heavy metal salts, the activators employed being organic compounds in which the molecule contains keto and hydroxyl groups.

According to the proposed process, to be more precise, an alkyl benzene or a group of alkyl benzenes is subjected to oxidation in the presence of an aliphatic carboxylic acid that is liquid in the conditions of reaction.

The carboxylic acids preferred are acetic and propionic acids, used in the proportion of one to 10 parts by weight to each part by weight of alkyl benzene.

The catalysts for the oxidizing reaction consist of heavy metal salts, among which preference should be given to the salts of cobalt and manganese, normally to be used in acetate or halide form.

The catalytic salts are added to the reaction environment in the proportion of 0.1 to 5.0 parts by weight to every 100 parts by weight of the alkyl aromatic hydrocarbon that is to be oxidized.

As already stated, the purposes of the invention are achieved by employing as activators organic compounds in which the molecule contains alcohol groups and ketone groups, preferably diacetone alcohol, which has shown itself to be the most active and selective in the oxidation of alkyl benzenes.

It has been found that the best results are obtained when the concentration of the activator is maintained at a level of between 0.5 and 5.0 by weight in the reaction mixture.

By the use of such activators, the xylenes are oxidized to form the corresponding phthalic acids, the conversion rate equalling or exceeding 93 percent in mols, when the reaction takes place at temperatures of 100° C. to 160° C. and pressures of 5 to 30 atmospheres, the oxidizing gas being oxygen or gases containing molecular oxygen.

By the method here proposed, it is also possible for toluene to be oxidized to benzoic acid and p-diisopropyl benzene to terephthalic acid.

The oxidizing reaction may be carried out either discontinuously or (preferably) continuously.

Where the process is continuous, elongated reaction vessels equipped with agitators may be used.

The alkyl benzene or mixture of alkyl benzenes, the carboxylic acid and the catalyst consisting of salts of one or more heavy metals are admitted to the top of the reaction vessel, while the oxidizing gas, preferably air, is fed to the base at a rate such that the gases at the top of the vessel contain between 1 percent and 5 percent of oxygen.

The whole or only part of the activator may be added at the top of the vessel; in the latter case, several points of admission may be used along the body of the vessel.

The following examples of experiments will serve as a better illustration of the process, but they should not be held to imply any limitation on the scope of the invention.

EXAMPLE 1

An elongated tubular reaction vessel of about 10 liters capacity was used, this being equipped with effective agitation, a heat-exchange jacket and arrangements for introducing the reagents and removing the reaction products.

The top of the vessel was also fitted with facilities for condensing and re-cycling condensable products.

The following were fed continuously to the top of the reaction vessel: 0.8 liters/hour of p-xylene, 4 liters/hour of acetic acid (97 percent conc.) and 100 ml./hour of an aqueous solution containing 150 g./liter of cobalt bromide and 150 g./liter of manganese bromide. Diacetone alcohol was also fed to the top of the vessel at the rate of 90 ml./hour, a second similar feed being provided approximately half-way up the vessel.

Air was fed to the base of the reaction vessel at the rate of about 2,300 N. liters an hour.

The working temperature and pressure were 130° C. and 9 atmospheres.

The reaction products were removed continuously from the base of the vessel, terephthalic acid being recovered from these and washed with water and acetic acid.

By this means, an average of about 1 kg./hour of pure terephthalic acid was obtained.

EXAMPLE 2 (comparative).

The same procedure was followed as in Example 1, except that the diacetone alcohol was omitted.

By this means, the rate of conversion of the p-xylene to terephthalic acid was less than 80 percent in mols.

What we claim is:

1. In a process for the production of aromatic carboxylic acids consisting essentially of oxidizing, in a reaction zone, alkyl benzenes and mixtures thereof employing an oxidizing gas comprising oxygen or a gas containing molecular oxygen in the presence of an aliphatic carboxylic acid reaction solvent, said aliphatic carboxylic acid being liquid under the reaction conditions existing in the reaction zone, employing a catalytic amount of a heavy metal salt catalyst and an activator therefor, collecting the reaction products from the reaction zone and separating therefrom the product aromatic carboxylic acid corresponding to the alkyl benzene feed, the improvement consisting essentially of conducting the oxidation reaction at a temperature of from 100° to 160° C and at a pressure of from 5 to 30 atmospheres employing an activator consisting essentially of diacetone alcohol.

2. The process of claim 1 wherein said aliphatic carboxylic acid is acetic or propionic acid.

3. The process of claim 2 wherein said aliphatic carboxylic acid is employed in a proportion of from one to 10 parts by weight to each part by weight of said alkyl benzenes.

4. The process of claim 1 wherein said catalyst is a salt of cobalt or manganese and is employed in a proportion of from 0.1 to 5.0 parts by weight to every 100 parts by weight of said alkyl benzene.

5. The process of claim 4 wherein said catalyst is a halide or acetate salt of cobalt or manganese.

6. The process of claim 1 wherein said alkyl benzene comprises para-xylene and wherein the corresponding aromatic carboxylic acid is terephthalic acid.

7. The process of claim 1 wherein said alkyl benzene comprises toluene and wherein the corresponding aromatic carboxylic acid comprises benzoic acid.

8. The process of claim 1 wherein said alkyl benzene comprises para-diisopropyl benzene and wherein the corresponding aromatic carboxylic acid comprises terephthalic acid.

9. The process of claim 1 wherein said oxidizing gas is air and wherein the air is fed to the reaction zone in an amount such that the gas exiting from the top of the reaction zone comprises between 1 and 5 weight percent oxygen.

10. The process of claim 1 wherein the reaction is conducted in an elongated reaction vessel, wherein the alkyl benzenes, catalysts, and aliphatic carboxylic acid are fed to the top thereof, and wherein only a portion of said activator is fed to the top of said reaction vessel, the remaining portion of the activator being fed to the reaction vessel at a point along the body thereof.

11. The process of claim 1 wherein said diacetone alcohol is fed to the reaction zone in an amount sufficient to maintain a concentration of said diacetone alcohol in said reaction zone of from 0.5 to 5.0 parts by weight per 100 parts of said alkyl benzenes.

12. In a process for the production of terephthalic acid consisting essentially of oxidizing, in a reaction zone, para-xylene with air in the presence of from one to 10 parts by weight to every part by weight of said para-xylene of an aliphatic carboxylic acid reaction solvent comprising acetic or propionic acid, employing from 0.1 to 5 parts by weight to every 100 parts by weight of said para-xylene of a catalyst comprising a halide or acetate salt of cobalt or manganese and an activator therefor, collecting the reaction product from the reaction zone and separating therefrom the product terephthalic acid, the improvement consisting essentially of conducting the oxidation reaction at a temperature of from 100° to 160° C and at a pressure of from 5 to 30 atmospheres employing from 0.5 to 5 parts by weight per 100 parts by weight of said para-xylene of an activator consisting essentially of diacetone alcohol.

* * * * *